United States Patent [19]

Knödler et al.

[11] Patent Number: 4,761,353
[45] Date of Patent: Aug. 2, 1988

[54] ELECTROCHEMICAL STORAGE CELL

[75] Inventors: Reinhard Knödler, Sandhausen; Werner Bansemir, Schriesheim; Stefan Mennicke, Leimen; Günther Steinleitner, Schriesheim, all of Fed. Rep. of Germany

[73] Assignee: Brown, Boveri & Cie AG, Mannheim, Fed. Rep. of Germany

[21] Appl. No.: 45,679

[22] Filed: May 1, 1987

[30] Foreign Application Priority Data

May 6, 1986 [DE] Fed. Rep. of Germany ....... 3615238

[51] Int. Cl.⁴ .......................................... H01M 10/39
[52] U.S. Cl. .................................................. 429/104
[58] Field of Search ........................................ 429/104

[56] References Cited

U.S. PATENT DOCUMENTS

| 4,076,903 | 2/1978 | Sudworth et al. | 429/104 |
| 4,146,683 | 3/1979 | King | 429/104 |
| 4,166,156 | 8/1979 | Ludwig | 429/104 |
| 4,615,957 | 10/1986 | Kagawa | 429/104 |

Primary Examiner—Anthony Skapars
Attorney, Agent, or Firm—Herbert L. Lerner; Laurence A. Greenberg

[57] ABSTRACT

An electrochemical storage cell based on sodium and sulfur having an anode space and a cathode space, which are separated from one another by a solid electrolyte and are defined at least in some areas by a metal housing wherein the cathode space, in order to form the electrode, is filled with filamentary material of graphite or carbon that is saturated with sulfur. Between the solid electrolyte and the electrode of the cathode space, at least one intermediate film is provided, by means of which a sliding of the electrode along the surface of the solid electrolyte is assured.

4 Claims, 1 Drawing Sheet

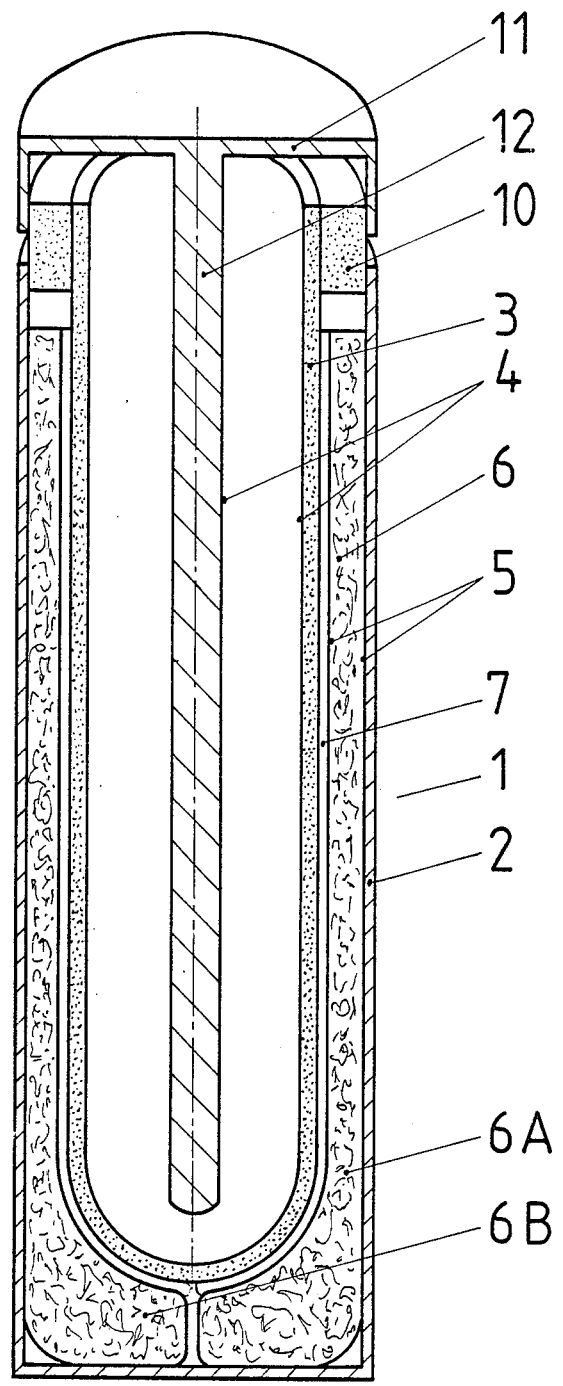

ELECTROCHEMICAL STORAGE CELL

BACKGROUND OF THE INVENTION

1. Field of the Invention

The invention relates to an electrochemical storage cell based on sodium and sulfur with a anode space and a cathode space, which are separated from one another by a solid electrolyte and are defined at least in some areas by a metal housing, wherein the cathode space, in order to form an electrode, is filled with filamentary material of graphite or carbon that is saturated with sulfur.

2. Description of the Prior Art

Such electrochemical storage cells are suitable as energy sources. They are increasingly used in designing storage batteries that are intended for supplying current to electric vehicles.

One special example of these storage cells is those cells based on sodium and sulfur, which are rechargeable and have a solid electrolyte of beta-aluminum oxide, which separates the anode space from the cathode space. One pronounced advantage of these storage cells is that when they are charged, secondary electrochemical reactions do not take place, and the current yield is approximately 100%. In such storage cells, the anode space is filled with sodium and disposed inside the cup-shaped solid electrolyte. The cathode space is located between the solid electrolyte and the metal housing, which defines the storage cell with respect to the outside. Inside the cathode space, in storage cells known until now, a long-filament material of graphite or carbon is provided, which to form the electrode is saturated with sulfur. When the storage cells are produced, half-shell-like elements are shaped from the the filamentary material, saturated with sulfur and then inserted into the cathode space. The storage cells are manufactured at room temperature. For operation, the storage cells are heated to a temperature of 350° C. If a storage cell is exposed to this kind of temperature influence, the result is an expansion of the filamentary material, and in particular of the two half-shells that are disposed in the cathode space. They expand to such an extent that their face ends are flush with one another, and the fibers of one half extend into the fibers of the other half such that no space remains in the boundary area of the half shells. When the storage cells are discharged, the sodium ions contained in the anode space pass through the solid electrolyte into the cathode space, where they form sodium polysulfide with the sulfur provided there. Because the half-shells formed from the long-filament material now touch one another closely, the sodium polysulfide can be uniformly distributed, in particular via the boundary spaces of the two half-shells, in the cathode space. If such a storage cell containing relatively large quantities of sodium polysulfide in the cathode space is cooled to a temperature below 280° C., then it solidifies into a closed ring that firmly surrounds the solid electrolyte. The sodium polysulfide has a higher thermal coefficient of expansion than the beta-aluminum oxide from which the solid electrolyte is made. This means that the ring formed from the sodium polysulfide shrinks onto the solid electrolyte when it cools. As a result, it adheres very firmly to the outer surfaces of the solid electrolyte, and with decreasing temperature exerts such force upon the electrolyte that breakage of the solid electrolyte can result.

SUMMARY OF THE INVENTION

It is accordingly an object of the invention to embody an electrochemical storage cell of the above generic type such that shrinkage onto the solid electrolyte of the sodium polysulfide ring that forms at temperatures below 280° C. is precluded.

With the foregoing and other objects in view, there is provided in accordance with the invention an electrochemical storage cell based on sodium and sulfur with an anode space and a cathode space, which are separated from one another by a solid electrolyte and are defined at least in some areas by a metal housing, wherein the cathode space, in order to form an electrode, is filled with filamentary material of graphite or carbon that is saturated with sulfur, the improvement comprising, providing between the solid electrolyte and the electrode of the cathode space at least one intermediate film, by means of which a sliding of the electrode along the surface of the solid electrolyte is assured.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing, in which is diagrammatically shown in vertical section an electrochemical storage cell having a metal housing, a cup-shaped solid electrolyte made of beta aluminum oxide disposed in the interior of the housing, an intermediate space between the outer surfaces of the solid electrolyte and the inner surfaces of the metal housing which serves as the cathode space and contains carbon or graphite filamentary material. The filamentary material is compressed into two half-shells, saturated with sulfur and placed in the cathode space. An intermediate film is disposed between the half-shells and the solid electrolyte preventing mechanical contact between them and permitting sliding of the shells along the surface of the electrolyte.

DESCRIPTION OF THE PREFERRED EMBODIMENTS

By means of the intermediate film it is attained that direct, mechanical contact between the solid electrolyte and the electrode of the cathode space, or the ring of sodium polysulfide that forms, is reduced to a great extent. In accordance with the invention, the intermediate film is made of a material that either has a melting point below 300° C., or at the operating temperature of the storage cell does not have any solid poorly conducting areas. The intermediate film according to the invention has an optimal conductivity for sodium ions, so that the electrical properties of the storage cell are not impaired thereby. The slidable intermediate film is made of a material that corrosion-promoting anions, such as chloride ions, that have a deleterious effect on the life of the storage cell by causing pitting are not produced. The intermediate film provided in the cathode space has a very low modulus of elasticity. In particular, the intermediate film is selected such that the modulus of elasticity, henceforth called simply E modulus, is lower than the E modulus of ceramic and lower than the E modulus of the solidified sodium polysulfide, which is on the order of $5 \times 10^3$ MPa. The modulus of the solid electrolyte is $3 \times 10^5$ MPa. Preferably, anhydrous sodium hydroxide (NaOH), anhydrous molybdenum sulfide, titanium sulfide or graphite is used for forming the slidable intermediate film. In accordance with the invention, at least as much of the aforementioned material as forms a closed intermediate film is applied onto each half-shell facing the solid electrolyte.

The invention will be described in further detail below, referring to the drawing.

An electrochemical storage cell 1 is shown in vertical section in the drawing. The storage cell 1 is defined with respect to the outside by a metal housing 2, which in the exemplary embodiment shown here is cup-shaped. The inner surfaces of the metal housing are coated with an anti-corrosion film (not shown here). The likewise cup-shaped solid electrolyte 3 is disposed in the interior of the metal housing 2. It is made of beta-aluminum oxide that has a breaking strength of greater than or equal to 100 MPa. In the exemplary embodiment shown here, the interior of the solid electrolyte 3 serves as an anode space 4, which is filled with sodium. The dimensions of the solid electrolyte 3 are selected such that between its outer surfaces and the inner surfaces of the metal housing 2, a cohering intermediate space remains, which serves as the cathode space 5. The cathode space 5 contains the electrode 6, which is made from a felt-like or filamentary material based on graphite or carbon. The filamentary material is compressed into two half-shells 6A and 6B and then saturated with sulfur and placed in the cathode space. In order to prevent mechanical contact between the half-shells 6A and 6B and the solid electrolyte 3, an intermediate film 7 is disposed between the half-shells 6A and 6B and the solid electrolyte 3. This intermediate film is formed by either anhydrous sodium hydroxide, molybdenum sulfide, titanium sulfide or graphite. All these materials must be anhydrous. The intermediate film 7 is firmly joined either to the surface of the solid electrolyte 3 or to the surfaces of the half-shells 6A, 6B that are oriented toward the solid electrolyte. This intermediate film prevents a firm connection between the half-shells 6A, 6B and the solid electrolyte, especially whenever the storage cell 1 is cooled to a temperature below 280° C. By means of the intermediate film 7, sliding of the half-shells 6A and 6B along the surface of the solid electrolyte is assured. This is particularly advantageous whenever the storage shell 1 is cooled to a temperature below 280° C., and a rigid ring of sodium polysulfide forms inside the cathode space 5 and presses the half-shells 6A and 6B against the surface of the solid electrolyte 3. The sliding action precludes transmission of the compression forces, originating in the sodium polysulfide as it solidifies, to the solid electrolyte 3. The intermediate film 7 is preferably applied in a thickness of from 50 to 100 μm on the surface of the solid electrolyte 3 or onto the surfaces of the half-shells 6A and 6B. To improve the conductivity of this intermediate film 7, a defined quantity of beta-aluminum oxide can be mixed in with the material forming the intermediate film. The sodium hydroxide, molybdenum sulfide, titanium sulfide or graphite suitable for forming the intermediate film 7 has the property that either its melting point is below 320° C. and the material is liquid during the operation of the storage cell, the operating temperature of which is 350° C., or the sodium ion conductivity in the solid state is high. To embody the intermediate film a graphite spray can for instance be sprayed onto the surface of the solid electrolyte 3. It is also possible to immerse the solid electrolyte in a colloidal graphite dispersion. As a solvent in this case, a liquid is used that preferably evaporates at approximately 100° C. To form the intermediate film 7 on the surfaces of the half-shells 6A and 6B, the procedure can be such that sodium hydroxide (NaOH) flakes are ground to a powder and dried in a drying oven, so that they are anhydrous. Once the half-shells have been saturated with the sulfur, a powder mixture comprising the aforementioned sodium hydroxide and a defined proportion of beta-aluminum oxide powder is scattered on the still-liquid sulfur. After the compression and cooling of the half-shells, they are inserted into the cathode space 5. In a storage cell the solid electrolyte of which has an outside diameter of 2.5 cm and is 22 cm long, approximately 2 g of sodium hydroxide powder with which approximately 2 g of beta-aluminum oxide powder have been mixed is be applied, in order to form an optimal intermediate film 7. To form an intermediate film 7 that comprises molybdenum sulfide or titanium sulfide, the procedure is the same. In that case, the admixture of beta-aluminum oxide powder is unnecessary. For a storage cell 1 having a solid electrolyte 3 that has the above-mentioned dimensions, the amount of 2 g of molybdenum sulfide is again sufficient to form an effective intermediate film 7.

Once the cathode space of the storage cell has been formed in the manner described above, and the anode space filled with the required sodium and the solid electrolyte 3 inserted into the metal housing 2, the storage cell 1 is closed off from the outside in an air-tight manner. To this end, the ring 10 of alpha-aluminum oxide disposed on the upper open end of the solid electrolyte 3 is durably joined to the inner surface of the metal housing 2. The ring 10 is dimensioned such that it completely closes the cathode space 5 disposed between the solid electrolyte 3 and the metal housing 2. For the closure of the storage cell 1 toward the outside, a cap 11 is used, which partially surrounds the outer rim of the ring 10 and is durably joined to it. The cap 11 is made from an electrically conductive material that is resistant to sodium. A bar 12 is secured to the inside of the cap 11. This bar 12 is again made from an electrically conductive material and is electrically conductively joined to the inner surface of the cap 11. The bar 12 is dimensioned such that it protrudes far into the solid electrolyte 3 and serves as an anode current collector. The metal housing 2, which is directly bordered by the cathode space 5, serves as the cathode current collector.

The storage cell 1 according to the invention is not restricted merely to exemplary embodiments in which the intermediate film 7 is made from anhydrous sodium hydroxide, molybdenum sulfide, titanium sulfide or graphite. Instead, the invention also encompasses all intermediate films that have the initially described properties and that bring about a sliding action of the half-shells 6A and 6B on the surface of the solid electrolyte 3.

The foregoing is a description corresponding, in substance, to German application No. P 36 15 238.2, dated May 6, 1986, international priority of which is being claimed for the instant application and which is hereby made part of this application. Any material discrepancies between the foregoing specification and the specification of the aforementioned corresponding German application are to be resolved in favor of the latter.

We claim:

1. An electrochemical storage cell based on sodium and sulfur with an anode space and a cathode space, which are separated from one another by a solid electrolyte and are defined at least in some areas by a metal housing, comprising an electrode received in the cathode space and embodied as two half-shells surrounding the solid electrolyte and formed of compressed filamentary material or graphite or carbon saturated with sulfur, and an intermediate film having a thickness of substantially 50 μm applied to at least one of a surface of the solid electrolyte and surfaces of the half-shells facing the solid electrolyte, said intermediate film being formed of an anhydrous material selected from the group consisting of sodium hydroxide, molybdenum sulfide, titanium sulfide and graphite for promoting a sliding of the electrode along the surface of the solid electrolyte.

2. An electrochemical storage cell as defined by claim 1, wherein a beta-aluminum oxide in powder form is admixed with the anhydrous sodium hydroxide in powder form, and wherein the two powders are applied in a ratio of about 1:1 for forming the intermediate film onto the surfaces of the half-shells, facing the solid electrolyte.

3. An electrochemical storage cell as defined by claim 1, wherein the intermediate film is formed by spraying the surface of the solid electrolyte with graphite.

4. An electrochemical storage cell as defined by claim 1, wherein the intermediate film is formed by immersing the solid electrolyte in a graphite dispersion.

* * * * *